United States Patent [19]

Ford

[11] 4,130,097

[45] Dec. 19, 1978

[54] IGNITION SYSTEMS FOR INTERNAL COMBUSTION ENGINES

[76] Inventor: Eric H. Ford, 17, Kensington Gate, London, W.8., England

[21] Appl. No.: 842,953

[22] Filed: Oct. 17, 1977

Related U.S. Application Data

[63] Continuation of Ser. No. 572,889, Apr. 30, 1975, abandoned.

[30] Foreign Application Priority Data

May 7, 1974 [GB] United Kingdom ............... 20148/74

[51] Int. Cl.² .......................... F02P 5/04; F02P 1/00
[52] U.S. Cl. ........................ 123/117 R; 123/117 D; 123/148 E
[58] Field of Search ............ 123/117 R, 117 D, 148 E

[56] References Cited

U.S. PATENT DOCUMENTS

| | | | |
|---|---|---|---|
| 3,875,912 | 4/1975 | Bullo | 123/148 E |
| 3,896,776 | 7/1975 | Ford | 123/117 R |
| 3,921,610 | 11/1975 | Hartig | 123/148 E |
| 3,923,022 | 12/1975 | Scholl | 123/117 D |
| 3,946,709 | 3/1976 | Monpetit | 123/117 D |
| 3,955,723 | 5/1976 | Richards | 123/117 D |
| 3,957,023 | 5/1976 | Peterson | 123/148 E |
| 3,981,282 | 9/1976 | Ford | 123/117 R |
| 3,989,024 | 11/1976 | Lai et al. | 123/148 E |
| 3,996,911 | 12/1976 | Canup | 123/117 D |

FOREIGN PATENT DOCUMENTS

2302160  1/1973 Fed. Rep. of Germany ...... 123/117 R

*Primary Examiner*—Charles J. Myhre
*Assistant Examiner*—Raymond A. Nelli
*Attorney, Agent, or Firm*—Larson, Taylor and Hinds

[57] ABSTRACT

A closed loop electronic ignition system for internal combustion engines, in which a comparison is made between a signal derived from a fixed predetermined crank-shaft angle, and a signal derived from a predetermined point on the pressure rise curve after the commencement of the second stage of combustion within a cylinder of the engine, and if non-coincidence is detected between the two signals, the ignition timing is either advanced or retarded so as to maintain coincidence between the signals, so that the second stage of combustion always occurs at the fixed predetermined crank angle, the spark then being extinguished by switching the ignition coil "on" at this predetermined crank-shaft angle, irrespective of the speed and load on the engine, as well as all other parameters which can affect the ignition timing.

12 Claims, 13 Drawing Figures

IGNITION SYSTEMS FOR INTERNAL COMBUSTION ENGINES

CROSS REFERENCE

This Application is a continuation application to my application Ser. No. 572,889 filed Apr. 30, 1975 now abandoned and entitled "Improvements in ignition systems for internal combustion engines".

FIELD OF THE INVENTION

The present invention relates to an ignition system for internal combustion engines, and more particularly to the timing of the switching on and off of the spark.

DESCRIPTION OF THE PRIOR ART

A known type of ignition system for an internal combustion engine employs contact breaker points operated by a cam driven via suitable gearing from the engine crank-shaft. In this system the contacts are closed and thus the battery is connected across the ignition coil for a fixed number of degrees of crank-shaft rotation irrespective of engine speed. The duration of the spark, which commences when the contact breaker points are opened, is a function of the electrical parameters of the system, and is substantially independent of engine speed.

Another known type of ignition system for internal combustion engines employs a magnetic trigger to switch off the current to the ignition coil, so initiating a spark, the current being switched on again a suitable time before another spark is required. The period of time between switch off of the ignition coil, and switch on of the ignition coil is related by suitable control means to the speed of the engine such that the coil has sufficient "on" time for its magnetic field to accumulate sufficient energy to produce the spark.

A further known type of ignition system is triggered by opto-electronic means at appropriate crank-shaft positions, the triggering switching off the current to the ignition coil, the coil being reconnected to the battery a fixed period after switch off. In such a system the crank-shaft position at which a spark is initiated is precisely defined. The spark duration depends on the electrical parameters of the system, switch on of the coil being a fixed time after switch off rather than a particular number of crank-shaft degrees later. This system is effectively monostable, since the spark is produced by an electronic circuit which has a stable state in which the coil is "on" and is triggered to the unstable state to interrupt the current in the primary winding, and thus initiate the necessary secondary voltage to produce the spark, the circuit returning to the stable state a fixed time thereafter.

A known improvement upon the above monostable opto-electronically controlled system is a bistable system as disclosed in my U.S. Pat. Nos. 3,604,712 and 3,710,131, whereby the crank-shaft angles between the switch on and off of the coil are fixed.

In my U.S. Pat. No. 3,896,776 I have disclosed an ignition system for an internal combustion engine in which not only the timing of the spark is controlled in accordance with the speed and load on the engine, but the duration of the spark is controlled relative to the angular position of the crank-shaft such that the spark at the spark plug is extinguished at a predetermined crank-shaft angle irrespective of the crank-shaft angle at which the spark is initiated. In the preferred embodiment disclosed, this position is in the range of from 0° to 5° after top dead centre (A.T.D.C.)

The system disclosed in U.S. Pat. No. 3,896,776 utilizes the basic principle disclosed in my U.S. Pat. No. 3,981,282 concerning the automatic computerized advance and retard of spark ignition. In this latter application, the advance and retard of the spark ignition of an internal combustion engine is achieved electronically by generating two series of pulses in synchronism with the engine, using one series as a reference for maximum advance and "coil on", and the other series to operate a counter to count down the requisite number of pulses beyond the maximum advance point before the spark is initiated, the count of the counter being varied from a computer in accordance with speed and/or load on the engine.

In addition to the speed and/or load of the engine there are a number of other factors which to a greater or less extent affect the spark timing of an internal combustion engine.

The principal factors are: fuel octane rating, air temperature, humidity and air pressure.

It has been general practice to establish advance curve requirements for both speed and load changes on the particular engine concerned by dynometer testing using simulated conditions in the laboratory. Having obtained the advance curves for speed and load, mechanical means are constructed in order to reproduce these curves representing the required timing of the ignition by means of physical movement of the ignition system components relative to the engine's crank position, i.e. top dead centre (T.D.C)

It has further been proposed to use mechanical means to achieve advance or retard of the ignition timing, which takes into account the other factors noted above, such as fuel octane rating, air temperature, humidity and air pressure. Such systems are, of course, mechanically complicated and are liable to error and failure.

Studies of the combustion process within an internal combustion engine have shown that the combustion process has two distinct stages. Firstly, after the initiation of the spark, there is a low pressure stage wherein the mixture is igniting and a flame is starting to propogate within the combustion chamber. At some subsequent point in time a sudden rise in both the pressure and temperature within the cylinder is observed, which marks the commencement of the second explosive stage of combustion, hereinafter referred to as "the commencement of the second stage of combustion". During the initial stage of combustion temperatures and pressures within the combustion chamber are low compared with the temperatures, and pressures within the combustion chamber during the second stage of combustion.

By the commencement of the second stage of combustion the mixture in the cylinder is well alight, and the presence of any spark at the spark plug is irrelevant to the following process of combustion within the cylinder. It is the timing of the commencement of this second stage which is extremely important. Tests have shown that for best engine efficiency this sudden pressure and temperature rise should always occur at one fixed crank-shaft angle, regardless of all the variables which influence the spark timing requirement.

SUMMARY OF THE INVENTION

It is therefore an object of the present invention to provide a closed loop ignition system in which a predetermined pressure on the pressure rise curve occuring during the second stage of combustion can be accurately sensed in relation to a given fixed angular position, and maintained at this position under all engine conditions.

According to the present invention there is provided an electronic ignition system for an internal combustion engine, including: means for sensing a predetermined point on the pressure rise curve after the commencement of the second stage of the combustion process in a cylinder of the engine at each firing cycle; means for comparing the crank-shaft position of the commencement of the second stage of combustion with a fixed predetermined crank-shaft position; and means for advancing or retarding the ignition so as to maintain this predetermined crank-shaft position of the commencement of the second stage of combustion, irrespective of the speed and load on the engine, as well as all other parameters which can affect the ignition timing of the engine.

The means for sensing the commencement of the second stage of the combustion process may be an electromechanical transducer device, such as a piezo-electric detector, which will produce an electrical signal at the exact instant that the pressure rises above a predetermined value. Alternatively, the means for sensing the commencement of the second stage of the combustion process may be a second spark plug across which a low D.C. voltage is applied, the gap being short-circuited by the ionization of the combustible mixture when the flame has propogated to said second spark plug.

Preferably, the predetermined crank-shaft angle at which the commencement of the second stage of combustion occurs is ideally 10° A.T.D.C., but this may vary according to certain engine characteristics, more particularly those relating to the design of the cylinder heads.

Preferably, the electronic ignition system for an internal combustion engine includes means for generating a first series of square wave voltage pulses in synchronism with the engine revolutions to provide a series of alternate highs and lows; means for generating a second series of square wave voltage pulses at a frequency greatly in excess of the first series; means for counting a given number of the second series of voltage pulses from a given point in relation to the first series of voltage pulses; and means for producing an output of a given level from said counting means after said count has been completed; means for detecting the presence of both a signal at said given level from the first pulse generating means and the counting means, in order to bring about the initiation of the spark, the extinguishing of the spark being effected when the signal from the first generating means changes to the opposite level; and means for varying the count of the counting means in accordance with the position of the commencement of the second stage in the combustion process if this deviates from the predetermined crank-shaft position.

Preferably, in one form the electronic device controls the advance and retard of the ignition, the counting means starting to count near the position of maximum advance. Alternatively, the count may be started from the fixed coil turn on signal. Thus a signal at said given level from the first trigger initiates the count of the counting means, which then counts down the number it has been set to before giving a signal at said given level to cause the initiation of the spark, and then to permit the spark to continue until the pressure rise point is reached, and the coil is turned on.

The counting means is preferably a frequency divider whose count can be increased or reduced by a single step at each cycle of ignition.

BRIEF DESCRIPTION OF THE DRAWINGS

The present invention will now be described in greater detail by way of examples, with reference to the accompanying drawings, wherein.

DESCRIPTION OF THE PREFERRED EMBODIMENTS

The ignition control system according to the present invention will now be described with reference to a four cylinder internal combustion engine.

Figure 1:
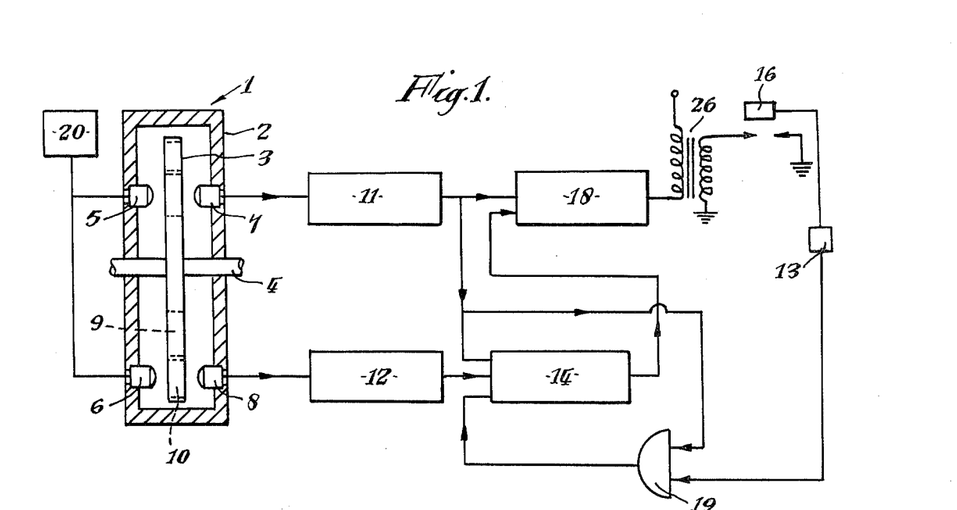
FIG. 1 is a diagram (partly in block form) of one form of spark control device for use with a spark ignition system of an internal combustion engine.
Figure 2:
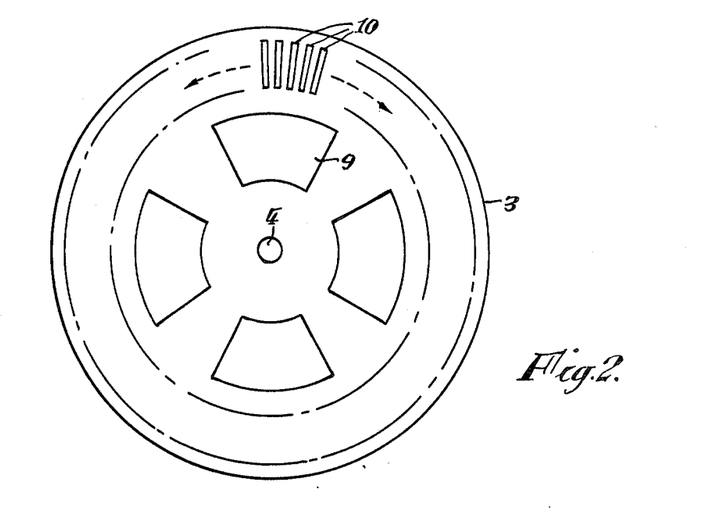
FIG. 2 is a front view of the disc shown in FIG. 1.

Referring to FIGS. 1 and 2, the device achieves electronic control of the advance and retard of the initiation of the spark through the detection of the crank-shaft position of the commencement of the second stage of the combustion within the cylinders. The device includes a radiation chopper device generally designated 1; a first fast inverse switching trigger circuit 11; a second fast inverse switching trigger circuit 12; a frequency divider 14; a pressure detector stage 16; an AND gate 19; and a power transistor stage 18.

Circuit details of the two inverse fast switching triggers 11 and 12 and the power transistors stage, 18 have been disclosed in my U.S. Pat. No. 3,981,282.

The radiation chopper device 1 consists of a housing 2; a disc 3; a shaft 4 carrying the disc 3; infra-red radiation sources 5 and 6; and radiation detectors 7 and 8. The infra-red radiation sources 5 and 6 are preferably gallium arsenide lamps, and the radiation detectors are preferably photo-transistors, all these elements being fixed to the housing 2. The shaft 4 is journalled in bearings (not shown) in the housing 2, and is driven at cam shaft speed of the engine.

The chopper disc 3 comprises two series of concentric apertures 9 and 10. There are four large apertures 9 in equi-spaced relation, and a large number of small apertures or slits 10 (e.g. 68). The apertures 9 permit infra-red radiation from the lamp 5 to reach the photo-transistor 7, and the slits 10 permit infra-red radiation from the lamp 6 to reach the photo-transistor 8. The lamps 5 and 6 are energized through a common stabilized voltage source 20.

The output from the respective photo-transistors 7 and 8 is fed to the inputs of respective fast inverse switching triggers 11 and 12. The output from the first trigger 11 is applied firstly to the power transistor stage 18, and secondly to a first input of the AND gate 19. The output of the second trigger 12 is fed to the frequency divider 14, which normally gives a "0" output, but which on completion of the count down set therein through the operation of the AND gate 17 gives a "1" output. The pressure detector stage 16 is preferably a piezo-electric detector, and is designed to give an output when the pressure exceeds a predetermined value. The piezo-electric detector is housed either in the wall of the cylinder above the piston when located at T.D.C., or in the upper cylinder head on the opposite side from the spark plug. The output from the piezo-electric detector is applied to a third trigger 13, which squares the output pulse, and applies it to a second input of the AND gate 19. The AND gate 19 detects whether or not there is a simultaneous coincidence of "1" on both its inputs and in the event there is coincidence, it provides an output to adjust the count of the counter 14 by one step at a time to advance the ignition by a few degrees, in order to ensure that the pressure peak occurs at a predetermined crank-shaft angle, which is preferably 10° A.T.D.C. The power transistor stage 18 controls the current flow through the primary winding of the ignition coil 26. When the outputs from the stages 11 and 14 are either "0" and "1" or "1" and "0" or "0" and "0" current flows through the primary winding of the ignition coil 26, but when both outputs are at the high level "1", then the current through the coil is interrupted, producing the collapse of the magnetic field and the resultant high secondary voltage necessary for the spark.

Figure 3:
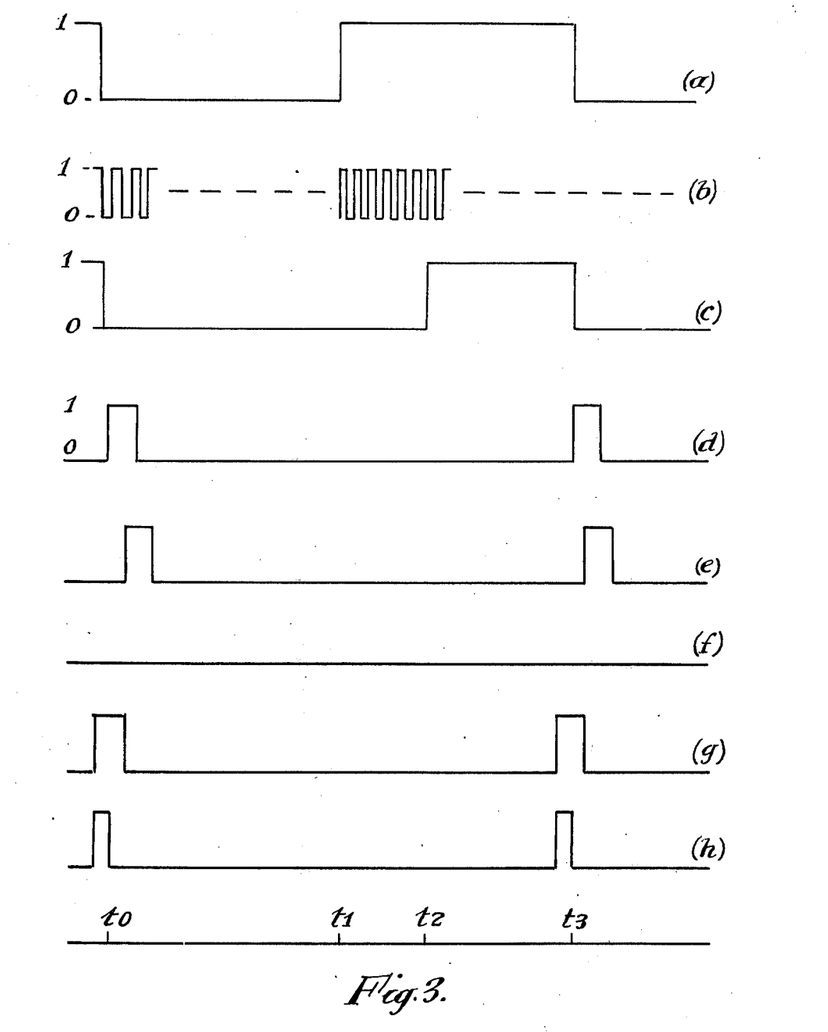
FIG. 3 is a set of waveforms which assist in explaining the operation of the circuit shown in FIG. 1.

The operation of the electronic spark control device will now be described in greater detail with the aid of the waveforms shown in FIG. 3. As the disc 3 is rotated at crank-shaft speed of the engine, the infra-red radiation from the lamps 5 and 6 impinges on the respective photo-transistors 7 and 8 through the apertures 9 and slits 10. Accordingly, the photo-transistor 7 produces four current pulses per revolution of the disc 3, whilst the photo-transistor 8 produces a large number (e.g. 68) of pulses per revolution. The two triggers 11 and 12 fast switch and amplify these pulses to produce the waveforms (a) and (b) respectively. During the interval between crank-shaft positions t0 and t1 the photo-transistor 7 is energized by infra-red radiation, and is therefore conductive. The output from the first trigger is at the low level representing a "0." At the position t1, the infra-red radiation is cut off and the output of the first trigger becomes high representing a "1". This output is applied to both the frequency divider 14 and the first transistor of the power transistor stage 18. The frequency divider 14 now counts the pulses from the second trigger 12 according to the number set therein. The output of the frequency divider 14 is at the low level "0" from crank-shaft position t0 up to and beyond the crank-shaft position t1. Therefore, when the trigger 11 produces a high level output, the power transistor stage is not switched because of the continued presence of a low level output from the frequency divider 14. In the example illustrated, the frequency divider 14 is set to count down a total of six pulses before its output switches to the high level. Therefore, at crank-shaft position t2, when the count of six has been completed, the output becomes high at the seventh pulse, and the power transistor stage switches off the flow of current in the primary winding of the ignition coil 26, and thus initiates the spark through the high induced secondary voltage on the collapse of the field in the primary winding of the coil. At crank-shaft position t3 which is the idealized crank-shaft position at which the commencement of the second stage of the combustion should occur, the output of the first trigger reverts to the low level, thus extinguishing the spark, and resetting the frequency divider, which also reverts to the low level, as shown by waveform (c), these events both happening when the photo-transistor 7 is again energized by infra-red radiation.

Waveform (d) shows the "1" output from the third trigger 13 when the combustion within the cylinder has reached its second stage, and has been detected by the piezo-electric detector 16.

The circuit is designed to operate about the ideal position when the leading edge of the waveform (d) coincides with the crank-shaft position t3, this leading edge representing the commencement of the second stage of combustion. If, as shown in waveform (e), the leading edge of the pulse from the trigger 13 occurs after the position t3, the AND gate 19 does not detect any coincidence between the "1" outputs from the first trigger 11 and the third trigger 13, as shown in waveform (f). Under these conditions the count of the counter 14 is reduced by one step at a time until coincidence is detected. If, on the other hand, as shown in waveform (g), the leading edge of the pulse from the trigger 13 occurs before the crank-shaft position t3, the AND gate detects coincidence as shown in its output waveform (h). Under these conditions the count of the counter 14 is increased by one step at a time until coincidence is no longer detected. Thus, under normal running conditions, the count of the counter is adjusted by increments so as to maintain the leading edge of the waveform (d) at the crank-shaft position of t3.

Figure 4:
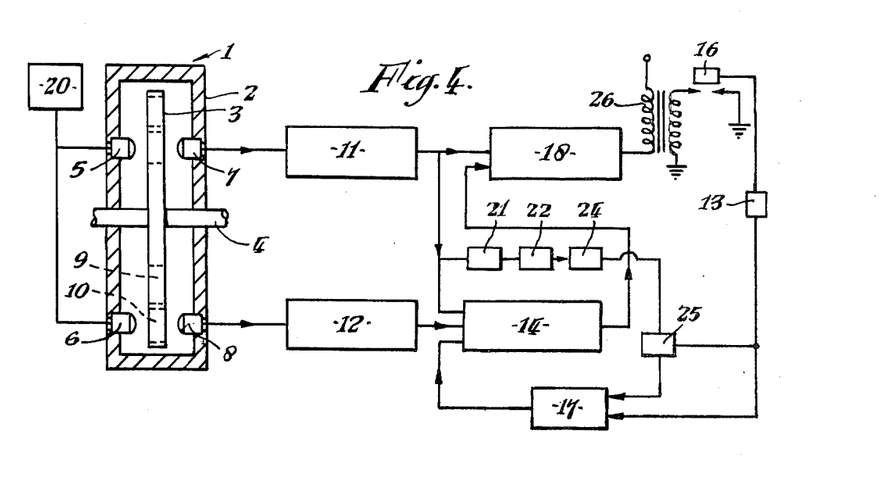
FIG. 4 is a diagram (partly in block form) of an alternative form of spark control device to that shown in FIG. 1.
Figure 5:
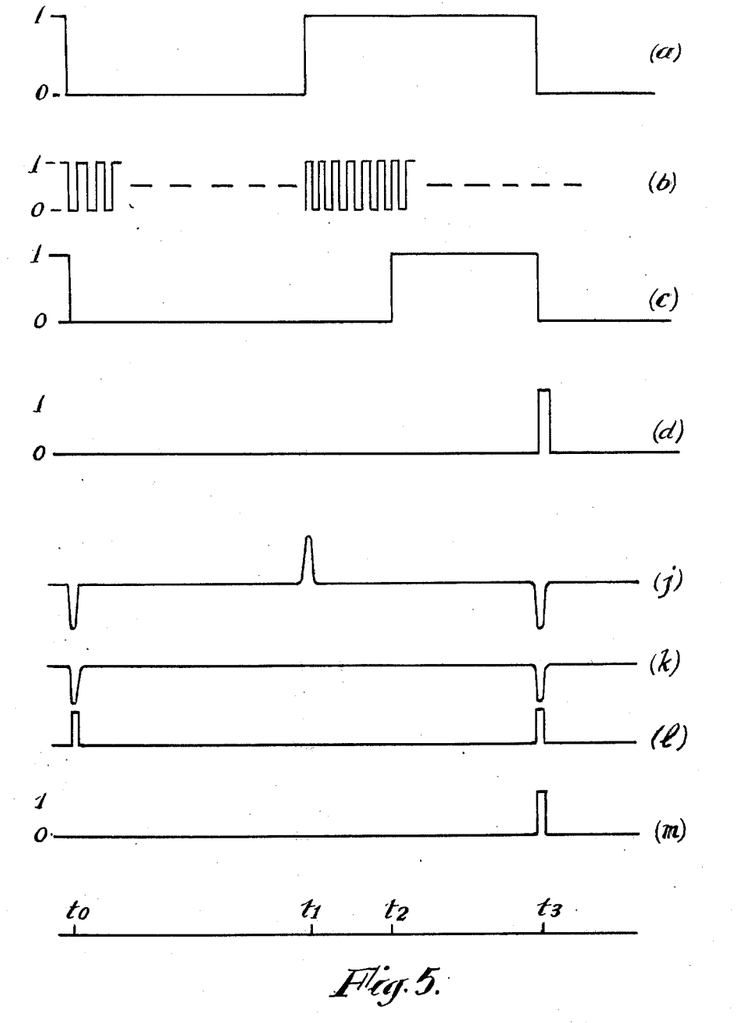
FIG. 5 is a set of waveforms which assist in explaining the operation of the circuit shown in FIG. 4.

An alternative embodiment also using a piezo-electric detector is shown in FIGS. 4 and 5. In this form, the AND gate 19 is replaced by a comparator 17. A differentiating circuit 21, a limiter 22, an inverter 24 and a frequency divider circuit 25 are connected in series between the output of the first trigger 11 and one input of the comparator 17. The frequency divider circuit in this example performs a division by four and is synchronized from the third trigger 13.

The output of the first trigger 11 which is applied to the differentiator 21 is the square waveform (a). The differentiator 21 provides an alternate series of positive and negative going spikes as shown in waveform (j), the positive spikes being clipped off by means of the limiter circuit 22 to provide waveform (k). The negative going spikes of waveform (k) are then inverted and shaped in the circuit 24 as shown in waveform (l). The frequency divider 25 allows only one pulse in four to be applied to the comparator 17, such a pulse being shown by waveform (m). In order to ensure that this selected pulse passed by the frequency divider 24 corresponds to the firing of the cylinder associated with the piezo-electric detector 16, a synchronization link is provided between the third trigger 13, and the frequency divider 25 to ensure that the latter remains synchronized at all times.

The comparator 17 thus compares the position of the pulse output from the third trigger 13 (waveform d) with that of the pulse output from the frequency divider 25 (waveform m). If the two pulses are coincident then there is no output from the comparator 17 to the counter 14, and its count remains unaltered. On the other hand, if the pulse of waveform (d) occurs before the pulse of waveform (m), then there is a negative output from the comparator, which effects a one step increase in the count of the counter 14, in order to retard the point at which the spark is induced. Likewise, if the pulse of waveform (d) occurs after the pulse of waveform (m), then there is a positive output from the comparator 17 which effects a one step decrease in the count of the counter 14 in order to advance the point at which the spark is induced. The increase or decrease of the count of the counter 14 will continue until the pulse of waveform (d) is coincident with the pulse of waveform (m).

In the above described alternative embodiment of FIGS. 4 and 5, the detection of the second stage of the combustion process is confined to one cylinder only, but a separate piezo-electric detector can be provided for each cylinder, in which case the frequency divider 25 is removed from the circuit. Such a multi-detector system has the disadvantage that if there are slightly different firing characteristics between cylinders, the count of the counter 14 will tend to hunt instead of remaining fixed under constant speed and/or load conditions.

Figure 6:
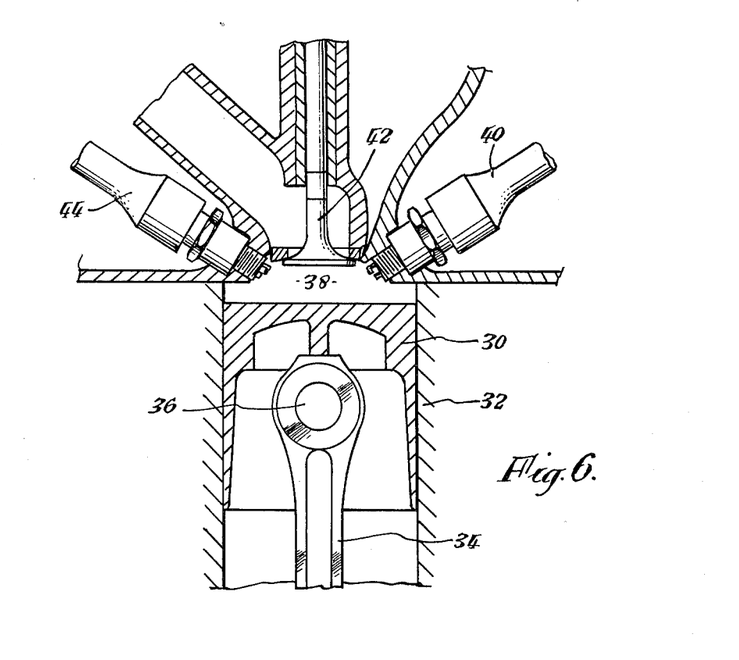
FIG. 6 is a cross sectional view through a cylinder showing a second method of detecting the commencement of the second stage of the combustion process in the cylinder using a second spark plug.

Instead of using an electro-mechanical transducer device to detect the commencement of the second stage of combustion, in a second preferred form it is possible to utilize a second spark plug as shown in FIG. 6, which is a cross sectional view through one cylinder of the four cylinder engine. As conventional, a piston 30 reciprocates within the cylinder wall 32, a connecting rod 34 being connected to the piston 30 by the little end 36. At the upper end of the cylinder head 38, there is provided, as conventional, a spark plug 40 and inlet valve 42 (the outlet valve not being shown in the drawing as it is positioned behind the inlet valve). A second spark plug 44 is provided on the other side of the cylinder head from the main spark plug 40. This second spark plug is utilized to detect the second stage of combustion within the cylinder when the main spark plug has ignited the compressed combustible mixture within the cylinder. In order not to interfere with the flame front, which propogates through the cylinder when the discharge across the points of the main spark plug 40 occurs, it is desirable that the second spark plug 44 is located as far away as possible from the main spark plug 40. In this particular design of cylinder, having overhead valves, the second spark plug 44 is conveniently located diametrically opposite to the main spark plug 40. In order to fit the second spark plug 44, it is desirable to slightly modify the position of the inlet and/or outlet manifolds from the cylinder head.

Figure 7:
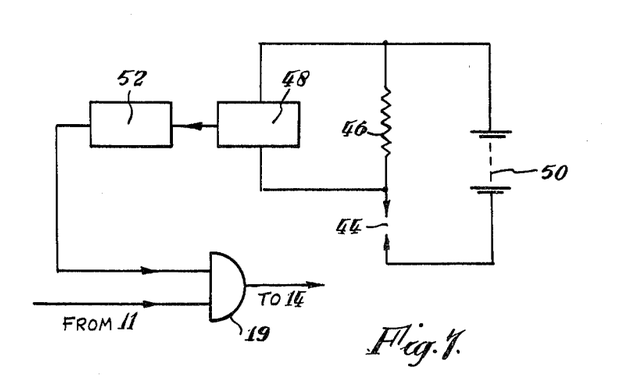
FIG. 7 is a circuit diagram illustrating this second method.

Referring now to FIG. 7, one simple circuit for detecting the second stage in the combustion process by means of the second spark plug, includes a resistor 46, a voltage detector 48, a 30 volt battery 50 and a pulse shaper 52. The resistor 46 is connected in series with the points of the second spark plug 44 across the battery 50. When there is no combustion in the cylinder no current flows in the resistor 46 because the spark plug 44 presents an open circuit. The voltage detector thus produces zero output. When the combustible mixture within the cylinder becomes compressed, and is ignited by the main spark plug 40, as soon as the gap across the second spark plug has become fully ionized upon the pressure wave front reaching the second spark plug at the commencement of the second stage of combustion, the spark plug presents a short circuit and current flows through the resistor 46. The voltage across this resistor rises, and is detected by the voltage detector 48. The resultant output pulse produced by the voltage detector during the brief instant that the spark plug 44 is short-circuited by the ionization of the gas within the cylinder, is shaped by the pulse shaper 52 to produce a square wave output. This positive going pulse is applied to either the AND gate 19 of the first embodiment, or the comparator 17 of the alternative embodiment.

Figure 8:
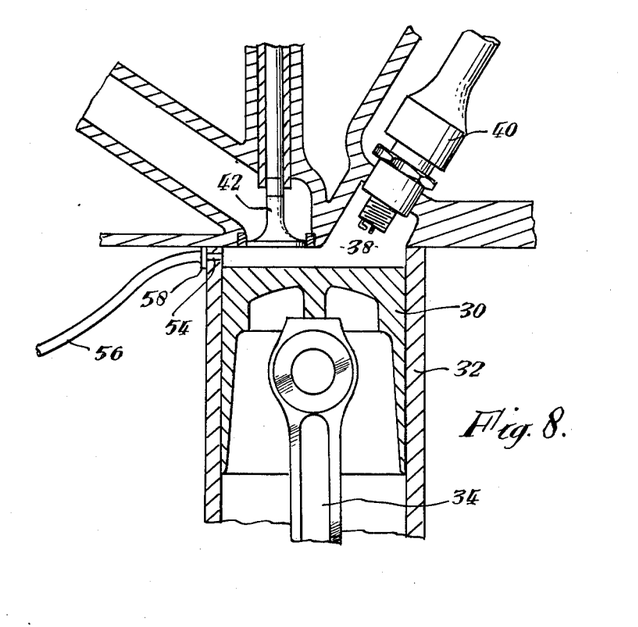
FIG. 8 is a cross sectional view through a cylinder showing a third method of detecting the commencement of the second stage of the combustion process in the cylinder by means of a fibre-optic cable and a translucent window in the upper part of the cylinder.

In the third way of detecting the commencement of the second stage of combustion, use is made of a fibreoptic cable and translucent window as shown in FIG. 8, which is a similar cross sectional view through one cylinder of the engine. In this embodiment the second spark plug is replaced by a quartz glass window 54. A fibre-optic cable 56 has one end clamped to the window 54 by suitable clamping means 58.

Figure 9:
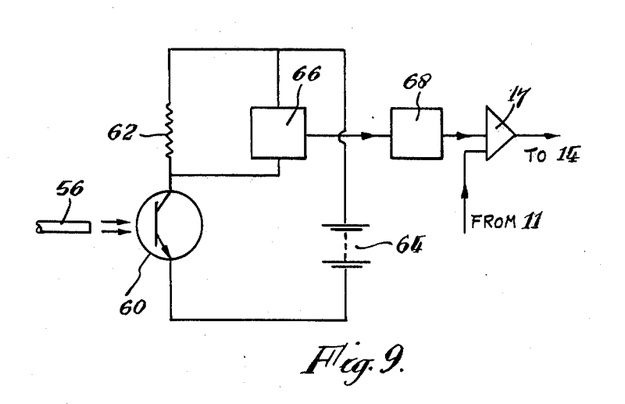
FIG. 9 is a circuit diagram illustrating this third method.

Referring to FIG. 9, the other end of the fibre-optic cable 56 is coupled to a photo-transistor 60, which is mounted in the distributor of the engine along with the rest of the double-trigger integrated circuitry except for the power transistor stage 18. The phototransistor 60 is connected in series with a resistor 62 across a battery 64. A voltage detector 66 is connected across the resistor 62. The radiation (whether visible and/or infra-red) from within the cylinder is transmitted through the quartz glass window 54, along the fibre-optic cable 56, to the photo-transistor 60. When the level of radiation exceeds a given value as a result of the sudden temperature rise at the commencement of the second stage of combustion, the photo-transistor 60 is energized. The photo-transistor 60 conducts and current flows from the battery 64 through the resistor 62. The rise in voltage across the resistor 62 is detected by the voltage detector 66. The resultant output pulse produced by the voltage detector during combustion is shaped by a pulse shaper 68 to produce a square wave output. This positive going pulse is applied to either the AND gate 19 of the first embodiment, or the comparator 17 of the alternative embodiment.

With any one of the described embodiments, the commencement of the second stage of combustion is always maintained at the same crank-shaft angle (e.g. 10° A.T.D.C.) irrespective of the speed of the engine, the load on the engine, air pressure, air temperature, humidity and other factors which can affect the performance of an internal combustion engine.

Figures 10, 12, 13:
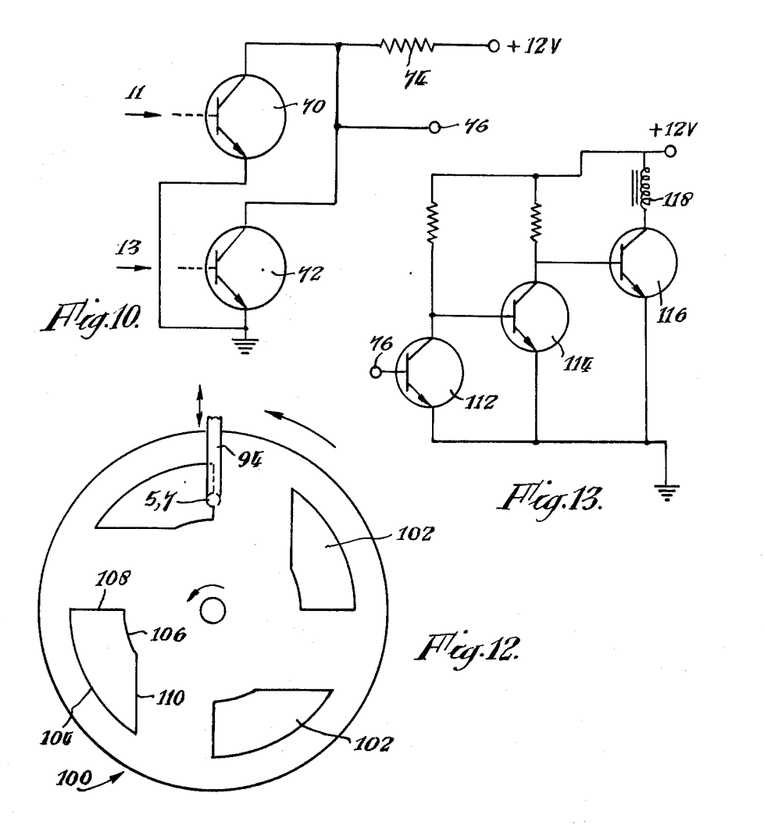
FIG. 10 is a circuit diagram showing an alternative form of combining the logical signals from the first and third triggers.
FIG. 12 is a view of the chopper disc for this second embodiment.
FIG. 13 is a circuit diagram of the circuit which energizes the solenoid shown in FIG. 11.

Instead of using an AND gate 19 in the embodiment shown in FIG. 1, the output stages of the first and third triggers could be connected as shown in FIG. 10. An output transistor 70 of the first trigger 11 is effectively connected in parallel with an output transistor 72 of the third trigger 13, each transistor being in series with a resistor 74 across a 12 volt supply. The logical output at 76 is fed to the counter 14. When both transistors are conductive and when one or the other is conductive the output is a logical "0". A logical "1" is produced when both are non-conductive simultaneously.

Whilst in the above described embodiments, the counting means starts to count near the position of maximum advance, it would be well within the scope of the invention to start the count from the fixed coil "on" position.

Figure 11:
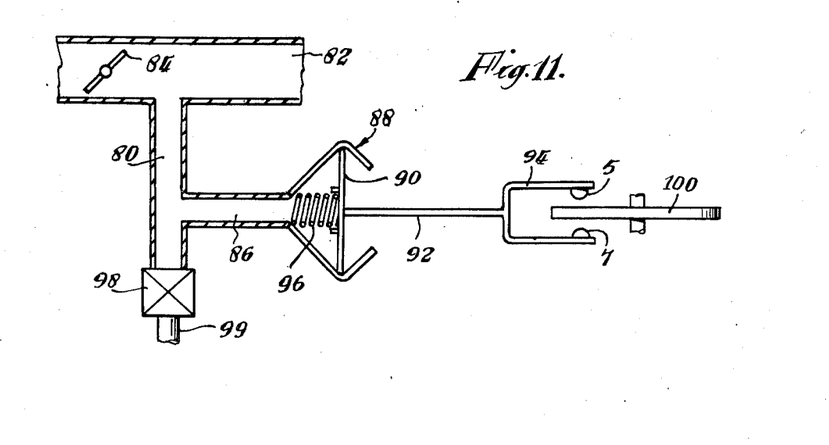
FIG. 11 is a part cross sectional view through the inlet manifold of the engine, showing a second embodiment of the invention, utilizing the vacuum in the inlet manifold.

In all the above embodiments, use has been made of the second trigger 12 and counter 14 in conjunction with the first trigger 11 and electro-mechanical transducer to determine the coil off position, i.e. the production of the spark such that the commencement of the second stage of combustion occurs at the precise crankshaft position at which the coil switches on to extinguish the spark. Instead of determining the required advance and retard electronically, it may be achieved by electromechanical means. In a second preferred form shown in FIGS. 11 to 13, the second trigger and frequency divider are omitted. This second distinct way of carrying out the invention utilizes the vacuum manifold of the engine. As shown in FIG. 11, a pipe 80 is connected to the engine inlet manifold of the carburettor 82 upstream of a throttle valve 84. The pipe 80 has a branch 86 connected to a chamber 88. The chamber 88 is provided with a diaphragm 90, to which is connected a rod 92 carrying a forked portion 94. The ends of the forked portion 94 carry the infra-red radiation source 5 and the detector 7 associated with the first trigger 11. A spring 96 is provided within the chamber 88 to urge the diaphragm 90 to its neutral position against the partial vacuum produced in the chamber 88. A solenoid valve 98 is provided to bleed air from the atmosphere into the chamber 88 from a pipe 99.

An apertured disc 100 is rotated in synchronism with the crank-shaft of the engine, and is positioned as shown in FIGS. 11 and 12 between the infra-red source 5 and detector 7. The disc 100 has four identical apertures 102 equi-spaced around the circumference of the disc. Each aperture 102 has arcuate outer and inner peripheries 104 and 106 respectively, a radial aligned edge 108 and a straight radially inclined edge 110. The radial edge 108 provides the constant coil "on" position to extinguish the spark and the radially inclined edge 110 provides the necessary advance and retard of the production of the spark (the coil "off" position) according to the distance of the infra-red source 5 and detector 7 from the centre of the disc 100. The output square waveform generated by the first trigger thus has a variable mark space ratio which is a function of the distance of the elements 5 and 7 from the centre of the disc.

The logical outputs from the first trigger 11 and the third trigger 13 are combined as shown in FIG. 10, the combined signal being available at the output 76. As shown in FIG. 13, the signal available at the output 76 is passed through three inverse switching stages 112, 114 and 116, the last stage 116 being in series with the energizing coil 118 of the solenoid valve 98.

This second embodiment operates as follows. The system is designed so that the vacuum of the inlet manifold of the engine pulls the diaphragm 90 against the action of the spring, so as to move the line of sight of the elements 5 and 7 radially outwards with respect to the disc 100, thus tending to increase the mark-space ratio of the output of the first trigger in order to over advance the ignition timing. When the timing becomes over-advanced, i.e. the leading edge of the waveform (d) is occurring before the crank-shaft position of t3, coincidence is detected at the output 76. This causes the transistor 112 to conduct, the transistor 114 to become non-conductive, and the transistor 116 to be conductive. When the transistor 116 becomes conductive, the solenoid 98 is energized to bleed in air into the chamber 88. This causes the diaphragm to relax slightly, and to move the line of sight of the elements 5 and 7 radially inwards, towards the centre of the disc 100, so as to effect a retard of the ignition timing. As soon as coincidence at the terminal 76 ceases, the circuit of the transistors 112 to 116 reverts to its other stable state to de-energize the solenoid 98. The system thus hunts about the point where the leading edge of the waveform (d) is maintained at the crank-shaft position t3.

What I claim and desire to secure by Letters Patent is:

1. An electronic ignition system for an internal combustion engine, including: means for generating a first series of square-wave, constant mark-to-space ratio voltage pulses in synchronism with the engine revolutions to provide a series of alternate first and second voltage levels; means for generating a second series of square-wave voltage pulses also in synchronism with the engine revolutions and at a fixed multiple of the first series of square-wave voltage pulses; means for counting a given number of the second series of voltage pulses from a predetermined point in relation to the first series of voltage pulses in order to initiate a signal for the production of the spark; means for sensing a predetermined point on the pressure rise curve after the commencement of the second stage of the combustion process in a cylinder of the engine at each firing cycle; means for deriving a digital signal from the sensing of the predetermined pressure point; means for digitally comparing the crank-shaft position corresponding to the said predetermined pressure point with a fixed predetermined crank-shaft position derived from said first series of voltage pulses; and digital means for advancing or retarding the ignition by subtracting or adding one pulse at a time to the given number of pulses of the second series to be counted, during each firing cycle, in order to maintain substantial coincidence between the predetermined pressure point in the second stage of combustion and said fixed predetermined crank-shaft position irrespective of engine requirements.

2. An application ignition system for an internal combustion engine, including: means for generating a first series of voltage pulses of fixed mark-space ratio in synchronism with the engine revoltuions to provide a series of alternate first and second voltage levels representing the digital values of "1" and "0", means for generating a second series of voltage pulses also in synchronism with the engine revolutions at a frequency greatly in excess of the first series of voltage pulses, said second series also having first and second voltage levels representing the digital value of "1" and "0"; means for counting a fixed number of the second aeries of voltage pulses from a given point in relation to the first series of voltage pulses; means for producing an output at one of said digital values from the counting means after said count has been completed; means for detecting the digital coincidence of signals from the first pulse generating means and the counting means in order to bring about the initiation of the spark; means for sensing a predetermined point on the pressure rise curve after the commencement of the second stage of the combustion process in a cylinder of the engine at each firing cycle; means for deriving a digital signal from the sensing means; means for detecting whether or not there is coincidence between the digital signal derived from the sensing means and the digital signal generated by the first pulse generating means; and digital means for advancing or retarding the ignition by one step at a time by subtracting or adding "one" to the given count of the counting means in order to maintain substantial coincidence of said signals irrespective of engine requirements.

3. An electronic ignition system according to claim 2, wherein the means for deriving a digital signal from the sensing means is a third pulse generating means which squares the output from the sensing means to provide a digital output.

4. An electronic ignition system according to claim 3, wherein the coincidence detecting means is an AND gate receiving on its two inputs and respective digital outputs from the first and third pulse generating means, said AND gate detecting whether or not there is a simultaneous coincidence of the digital value "1" on its inputs, whereupon, in the former case the given count of the counting means is reduced by "one" to advance the ignition timing, and in the latter case the given count of the counting means is increased by "one" to retard the ignition timing.

5. An electronic ignition system according to claim 3, wherein said coincidence detecting means is a comparator receiving on a first input a digital signal derived from one edge of a pulse generated by the first pulse generating means and on a second input the digital signal from the third pulse generating means, said comparator effecting a comparison of the crank-shaft position of the two digital signals and effecting either an increase or decrease in the given count in the counting means by one step at a time if the two signals are not coincident.

6. An electronic ignition system according to claim 5, additionally inclusing the series combination of: a differentiator; a limiter circuit; an inverter; and a frequency divider for deriving said digital signal from one edge of a pulse generated by the first pulse generating means, said frequency divider being synchronized from the output of the third pulse generating means.

7. An electronic ignition system according to claim 1, wherein the means for sensing the predetermined point on the pressure rise curve after commencement of the second stage of the combustion process in the cylinder is an electro-mechanical transducer device, which is located in the wall of the cylinder, above the level of the top of the piston at T.D.C.

8. An electronic ignition system according to claim 7, wherein said electro-mechanical transducer device is a piezo-electric detector.

9. An electric ignition system according to claim 1, wherein the means for sensing the predetermined point on the pressure rise curve after commencement of the second stage of the combustion process in the cylinder is an additional spark plug across which a low voltage supply is applied, means being provided for detecting the current flow across the gap of the spark plug, due to ionization of the fuel mixture on combustion.

10. An electronic ignition system according to claim 1, wherein the means for sensing the predetermined point on the pressure rise curve after commencement of the second stage of the combustion process in the cylinder is the combination of a translucent window located in the wall of the cylinder above the level of the top of the piston at T.D.C., a radiation sensitive device, and a fiber optic cable interconnecting the window and the radiation sensitive device, so as to sense the propogation of the flame through the combustible mixture.

11. An electronic ignition system according to claim 10, wherein said translucent window is made of quartz glass.

12. An electronic ignition system according to claim 10, wherein said radiation sensitive device is a photo-transistor.

* * * * *